COLOUR TELEVISION RECEIVERS

Filed Feb. 26, 1963

INVENTOR.

GERARD MELCHIOR

By Kurt Kelman

AGENT

United States Patent Office 3,267,211

Patented August 16, 1966

3,267,211

COLOUR TELEVISION RECEIVERS

Gerard Melchior, Levallois-Perret, France, assignor to Compagnie Francaise de Television, a corporation of France Filed Feb. 26, 1963, Ser. No. 261,031
Claims priority, application France, Mar. 2, 1962, 889,835
4 Claims. (Cl. 178—5.4)

The present invention relates to output circuits in the colour channel of television receivers adapted to receive a carrier wave modulated by a luminance signal $Y_w$ and by a sub-carrier which is alternatively modulated by two different colour signals $A_1$ and $A_2$, as is the case in the "SECAM" television system which is disclosed, for example, in the United States Patent 2,993,086.

In this system, the two chrominance signals $A_1$ and $A_2$ are alternately transmitted according to a line sequential pattern. Upon reception, they are converted into simultaneous signals, each signal being repeated during the line periods during which it is not transmitted, and the signals thus repeated and relating to the line of the image previously transmitted serving for the line being transmitted. Thus, three simultaneous signals $Y_w$, $A_1$ and $A_2$ are simultaneously available and are combined together to obtain the three primary colour signals applied to the image reproducing device.

A convenient manner of repeating the signals consists in applying them in parallel to a direct channel and to a channel including a delay line, for example of the ultrasonic type, which imparts a delay equal to the total time interval of an image line i.e. to the reciprocal of the line scanning frequency.

Obvious this delay line has to be designed with accuracy. In order to avoid using two delay lines, it is generally preferred to repeat the signals before switching—during line blanking time intervals—the sequential signals into distinct channels according to whether the signal concerned is an $A_1$ signal or an $A_2$ signal, i.e. the repetition is effected before the switching. The demodulation of the sub-carrier may then take place before the signal repetition, between this repetition and the switching, or after the switching. In the latter two cases, two sub-carrier demodulators are needed. A demodulation effected after the switching has this advantage that parasitic signals which might arise due to the switching are substantially less harmful when switching precedes demodulation.

While presenting the considerable advantage of requiring only one delay line, the repetition of signals before switching has however the secondary drawback of complicating the switching.

Instead of a simple switch, with one input and two outputs which may be used when switching takes place before repetition, a double switch is used, with two inputs, respectively connected to the outputs of the direct and delay channels, and two outputs, one for signals $A_1$, delayed or not delayed and one for signals $A_2$, also delayed or not delayed. This double switch has then to carry out alternately the connection "first input-first output" and "second input-second output," then "first input-second output" and "second input-first output."

It is an object of the invention to make the repetition of signals possible before switching, while still requiring only a simple switching device. To this end, at the output of the direct and delay channels, linear combinations $A_1+A_2$ and $A_1-A_2$ are formed, the primary colour signals being, in this case, derived from linear combinations of signals $Y_w$, $(A_1+A_2)$ and $(A_1-A_2)$.

According to the invention, there is provided a colour television receiver for receiving a carrier wave, modulated by a luminance signal and by a sub-carrier, which is modulated sequentially by two colour signals, and comprising a luminance channel and a colour channel which is fed by said sub-carrier, said colour channel comprising a direct channel and a channel comprising a delay device for repeating each of said colour signals during the periods during which it is not transmitted, wherein said direct and delay channels respectively feed the first and the second inputs of an adder and of a subtracting circuit, which, alternately, subtracts the output signals of the delayed channel from those of the direct channel and vice versa.

In a preferred embodiment, the above subtraction circuit includes a subtractor, the two inputs of which are respectively connected to the outputs of the direct and of the delayed channel and a switch with one output and two inputs which are respectively connected directly and through a polarity inverter to the output of the subtractor.

The invention will be best understood from the following description and appended drawings, wherein.

Figure 1:
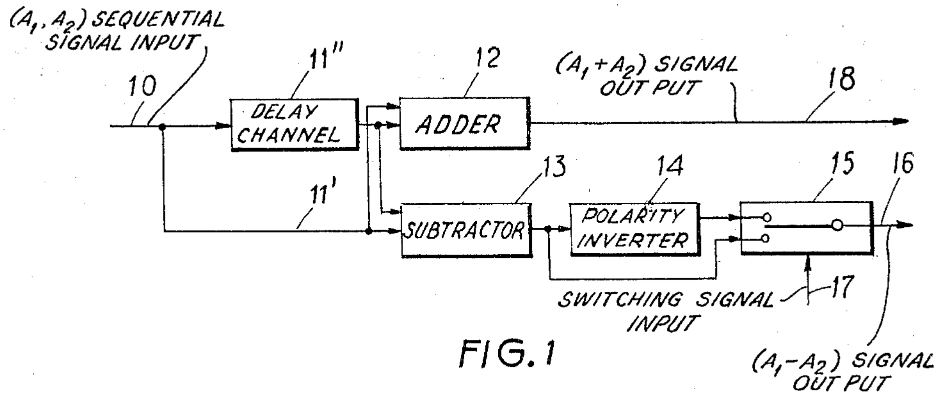
FIG. 1 shows a receiver according to the invention.

FIG. 1 shows the end portion of the colour channel of an embodiment of a receiver according to the invention, in the case where repetition occurs after demodulation of the sub-carrier. This comprises an input 10 to which the demodulated sub-carrier is applied. The colour channel up to this input 10, as well as the luminance channel, may be of the type shown in FIG. 3 of the above mentioned Patent No. 2,993,086. Input 10 feeds in parallel a delay channel 11″ comprising for example an ultrasonic line, imparting to signals propagating therethrough a delay equal to the reciprocal of the line frequency and a direct channel 11′.

Designating by letters $A'_1$ and $A'_2$ the output signals of the direct line and by $A''_1$ and $A''_2$ those of the delay channel, corresponding respectively to the transmitted signals $A_1$ and $A_2$, channel 11′ will alternately deliver signals $A'_1$ and $A'_2$ to the first inputs of an adder 12 and a subtractor 13.

The delay channel 11″ alternately delivers signals $A''_2$ and $A''_1$ to the second inputs of adder 12 and of subtractor 13.

Adder 12 delivers alternately signals $A'_1+A''_2$ and $A''_1+A'_2$, i.e. disregarding the delayed or not delayed character of the signals, it delivers permanently signal $A_1+A_2$.

Subtractor 13 delivers alternately $A'_1-A''_2$ and $A''_2-A'_1$, that is alternately $A_1-A_2$ and $A_2-A_1$. It feeds one input of a switching device 15 directly and the other through an amplifier 14 having a gain $-1$.

Switching device 15 is controlled at the rate of the alternation of signals $A_1$ and $A_2$, which are transmitted by the transmitter, so that its output 16 is always coupled to that input which receives signal $A_1-A_2$.

This control takes place by means of two-level switching signal applied to the control input 17 of the switching device 15. This signal is generated, for example, by a multivibrator (not shown) which is, in turn, controlled for example by means of the identification signal which precedes one of the two colour signals modulating the sub-carrier, as described in the above mentioned Patent No. 2,993,086. The multivibrator may be, for example, a monostable multivibrator, the duration of the unstable state of which is that of one line and which is tripped into its unstable state upon the occurrence of the above identification signal.

Thus, at output 18 of adder 12 and at output 16 of subtractor 15, two signals $A_1+A_2$ and $A_1-A_2$, respectively are made permanently available.

$Y_w$, $A_1+A_2$ and $A_1-A_2$, the same signals which may Accordingly, it is possible to obtain from the signals be obtained by a linear combination of signals $Y_w$, $A_1$ and $A_2$, whatever the nature of the sequential signals.

Of course adder 12 and subtractor 13 may be adjusted to give the sum and difference of their input signals with respective constant factors whenever this is desired.

This receiver is of particular interest when signals $A_1+A_2$ and $A_1-A_2$, or signals which respectively are proportional thereto, are desired as such.

Such a case will be now described and, in this connection, the following has first to be recalled.

In the "SECAM" system, the luminance signal $Y_w$ is a signal having a wide band *w*, while the colour signals $A_1$ and $A_2$ have a narrower band *n*.

More precisely designating by $V_w$, $R_w$ and $B_w$ the three primary gamma-corrected colour signals with a bandwidth *w*, the luminance signal transmitted is preferably of the form:

$$Y_w=\alpha V_w+\beta R_w+\gamma B_w$$

where $\alpha$, $\beta$ and $\gamma$ are three coefficients, the sum of which is equal to 1.

By way of example, for predetermined primary green, red and blue colours, these coefficients are 0.59, 0.30 and 0.11, respectively.

If R, B, V are the gamma-corrected colour signals with a bandwidth *n*, the Y signal is defined as $$Y=\alpha V+\beta R+\gamma B$$

i.e. R, B, V and Y are formed of the components in the band *n* of the signals $V_w$, $R_w$, $B_w$ and $Y_w$, respectively.

In a preferred embodiment of the receiver, the three signals used for obtaining the green, red and blue components of the colour images are:

$$V'=(V-Y)+Y_w=V+Y_h$$
$$R'=(R-Y)+Y_w=R+Y_h$$
$$B'=(B-Y)+Y_w=B+Y_h$$

wherein $Y_h$ represents the components of the signal $Y_w$ in the band $h=w-n$, i.e. the band *w* narrowed by the elimination of band *n*.

The component $Y_w$, common to V', R' and B' is identical with the signal modulating directly the carrier, and the components $R-Y$, $V-Y$ and $B-Y$ are derived from signals $A_1$ and $A_2$ which modulate the sub-carrier.

Such a method of producing V', R' and B' ensures a good optical quality of the colour images and other practical advantages.

The fact that the three difference signals $(V-Y)$, $(R-Y)$ and $(B-Y)$ may be derived from the two signals $A_1$ and $A_2$ may be explained by the fact that the three difference signals are not independent magnitudes, but are connected by the relation:

$$\alpha(V-Y)+\beta(R-Y)+\gamma(B-Y)=0$$

as may be readily seen from the expression of Y and the equality $$\alpha+\beta+\gamma=1$$

Generally, the addition of $Y_w$ with, respectively, $(V-Y)$, $(R-Y)$ and $(B-Y)$ is effected in a three-gun tricolour tube through applying signals $-Y_w$ to the cathodes of the three guns and signals $(V-Y)$, $(R-Y)$ and $(B-Y)$ respectively to the control electrodes of the "green," "red" and "blue" guns $(V-Y)$, $(R-Y)$ and $(B-Y)$ are then three of the four signals directly applied to the tube.

Under these conditions, a simple solution consists in taking as signals $A_1$ and $A_2$, two signals respectively proportional to two of the three difference signals, for example to $$d_1=R-Y \text{ and } d_2=B-Y$$

An improvement consists in transmitting not signals $R-Y$ and $B-Y$, but two signals $C_1$ and $C_2$, which are particular cases of $A_1$ and $A_2$ respectively proportional thereto, i.e. $C_1=K_1(R-Y)$ and $C_2=K_2(B-Y)$, where $K_1$ and $K_2$ are two constants determined in such a manner that the signals transmitted both vary in the same useful range, whereas $(R-Y)$ and $(B-Y)$ have, inherently, useful variations, different from one another. The term "useful range" means that certain extreme values of signals $R-Y$ and $B-Y$ which are theoretically possible but do not normally occur, are disregarded. If, R, B and V vary between 0 and 1, $R-Y$ and $B-Y$ have theoretical variation ranges respectively equal to $$\pm 0.7 \text{ and } \pm 0.89$$

Considering as "useful variation ranges" of $R-Y$ and $B-Y$, the ranges $$\pm\frac{3}{4}\cdot 0.7 \text{ and } \pm\frac{3}{4}\cdot 0.89$$

one obtains values $$K_1=\frac{4}{3}\cdot\frac{1}{0.7} \text{ and } K_2=\frac{4}{3}\cdot\frac{1}{0.89}$$

which gives signals $C_1$ and $C_2$, the common variation range of which is between $-1$ and $+1$.

The restoring of signals $R-Y$, $B-Y$ and $V-Y$ from signals proportional to $R-Y$ and $B-Y$, and in particular of signals $C_1$ and $C_2$, does not raise any difficulty.

It will be assumed that signals $A_1$ and $A_2$ instead of being of the form $C_1$ and $C_2$ as previously mentioned, are respectively equal to:

$$D_1=ad_1+bd_2$$
$$D_2=ad_1-bd_2$$

where *a* and *b* are two constants. Adding and subtracting:

$$D_1+D_2=2ad_1$$
$$D_1-D_2=Aad_2$$

This has the advantage of making it possible to collect directly at the outputs 18 and 16 (FIG. 1) signals proportional to $d_1$ and $d_2$, from which signal $d_3$ may be derived by a linear combination.

As was said before the adder and subtractor may be adjusted to give the sum and difference of their input signals with respective constant factors to supply $d_1$ and $d_2$ directly with the level required for further use.

Under these conditions, not only will be the switching device of the receiver of FIG. 1 substantially simplified, but, also, the circuit which generates signals $d_1$, $d_2$ and $d_3$ is as simple as when the signals transmitted are proportional to $d_1$ and $d_2$.

As to the selection of coefficients *a* and *b*, they would normally be taken equal to $$\frac{1}{2}K_1 \text{ and } \frac{1}{2}K_2$$

if $R-Y$ and $B-Y$ could practically both assume simultaneously their algebraically maximum values and simultaneously their algebraically minimum values. This however is not the case.

Therefore, *a* and *b* may be taken greater than $$\frac{1}{2}K_1 \text{ and } \frac{1}{2}K_2$$

and, taking advantage of this fact, it is possible to improve the signal-to-noise ratio, in view of the fact that the protection against noise of signal $R-Y$ increases with *a* and that of signal $B-Y$ increases with *b*.

On the other hand, experience shows that the visibility threshold of noise is lower with the red than with the blue.

Reverting to the expression of signals R', V', B' applied to the tube guns, it will be noted that the red colour will be protected the better as the coefficient *a* will be higher.

It is therefore advantageous, while selecting *a* and *b* in such a manner that the modulation capacity of the subcarrier is used at a maximum, to favour *a* with respect to $b$ so as to render the protection against noise for the eye uniform for all the colours.

By way of example, and considering the same useful variation range as before for $R-Y$ and $B-Y$, the following values may be taken:

$$a=\frac{4}{3}\cdot\frac{1}{0.445}$$

$$b=\frac{4}{3}\cdot\frac{1}{0.89}$$

For the eye, all the colours will then receive the same degree of protection.

Generally, $a$ and $b$ will be taken such that the useful variation ranges of $D_1$ and $D_2$ do not exceed the modulation capacity of the sub-carrier, the ratio $a/b$ being taken between 1 and 1/3.

Whatever the precise values of the coefficients, since signals $D_1$ and $D_2$ are linear combinations of signals R, B and V, they may be obtained in the transmission circuit, from these signals, by means conventional "matrices" effecting linear combinations of their input signals. It is however preferable to produce them from the difference signals $d_1$ and $d_2$, which have been obtained by a conventional matrix operation.

Figure 2:
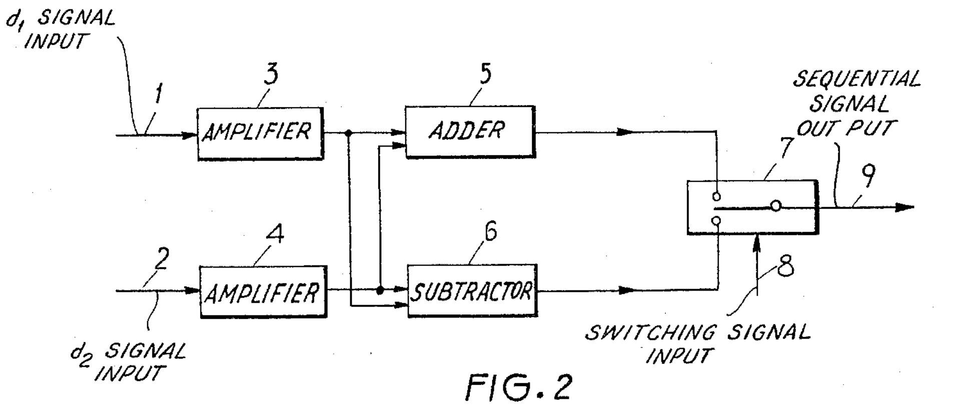
FIG. 2 illustrates a circuit of a possible embodiment of the transmitter associated with the receiver of FIG. 1.

In FIG. 2, a circuit of a transmitter according to the invention, which uses the above method, has been illustrated. In this figure, inputs 1 and 2 respectively receive signals $d_1$ (i.e. $R-Y$) and $d_2$ (i.e. $B-Y$) and feed two amplifiers 3 and 4 with respective gains $a$ and $b$. The output of amplifier 3 is applied the first inputs of an adder 5 and a subtractor 6, the second inputs of which are fed by amplifier 4. Signals $D_1$ and $D_2$ are respectively collected at the outputs of adder 5 and subtractor 6 and are applied to two inputs of a switch 7 operating at the line frequency by means of a signal derived from the synchronization circuits of the transmitter and applied to its control input 8. The sequential signal is collected at the output 9 of the switch and is used for modulating the sub-carrier.

This modification of the circuit elaborating the colour signals is the only one required with respect to a transmitter transmitting, for example, signals $C_1$ and $C_2$.

The invention is, of course, not limited to the embodiments described and illustrated.

What is claimed, is:

1. In a colour television receiver comprising means for receiving colour television signals; means for deriving from said colour television signals a sequential signal alternately built up by a first and a second colour information signal alternating at the line frequency, said sequential signal being such that the sum of, and the difference between, said sequential signal and a delayed signal derived from said sequential signal through delaying it by a duration equal to a line period, respectively build up a third and a fourth colour information signal; and means for deriving from an auxiliary signal included, at recurrent time intervals in said colour television signals, a switching signal having a first level or a second level according to whether said first or second colour information signal is present in said sequential signal:

a colour television receiver circuit for deriving from said sequential signal two simultaneous and separate colour information signals, said receiver circuit comprising: a first input; means for applying said sequential signal to said first input; a direct channel and a delay channel having respective inputs coupled to said first input, and respective outputs; said delay channel comprising a delay device for delaying the signal propagating therethrough by a duration equal to a line period, relatively to the signal propagating through said direct channel; an adding device having two inputs, respectively coupled to said outputs of said direct and delay channels, and an output, for delivering an output signal proportional to the sum of its two input signals; a subtracting circuit, having a first and a second input respectively coupled to said outputs of said direct and delay channels; said subtracting circuit comprising: first means for delivering a first difference signal which is equal, to within a constant factor, to the signal applied to the first input of said subtracting circuit minus the signal applied to said second input of said subtracting circuit; second means for delivering a second difference signal which is equal, to within said constant factor, to the difference between the signal applied to the second input of said subtracting circuit minus the signal applied to the first input of said subtracting circuit; said first and second means having respective outputs; and a two-state switch having a first and a second signal input respectively coupled to said outputs of said first and second means, and an output, said switch connecting its output to its first or to its second input according to whether it is one or the other of its two states; and means for applying said switching signal to said switch for causing said switch to assume its first state or its second state according to whether said first or said second colour information signal is building up said sequential signal; the output signals of said adding device and of said switch building up said two simultaneous signals.

2. A colour television receiver circuit as claimed in claim 1, wherein said first means are a subtractor having two inputs respectively building up the two inputs of said subtracting circuit, and wherein said second means are a polarity inverter having an input coupled to the output of said first means.

3. A colour television receiver circuit as claimed in claim 1, wherein said first and second colour information signals are video frequency colour signals.

4. A colour television receiver circuit as claimed in claim 3, wherein said video frequency colour signals are respectively proportional to $a(R-Y)+b(B-Y)$ and $a(R-Y)-b(B-Y)$, $(R-Y)$ and $(B-Y)$ being colour differences signals, and $a$ and $b$ being two constants.

References Cited by the Examiner

UNITED STATES PATENTS

| | | | |
|---|---|---|---|
| 2,993,086 | 7/1961 | DeFrance | 178—5.2 |
| 3,162,838 | 12/1964 | Sauvanet | 178—5.4 |

DAVID G. REDINBAUGH, *Primary Examiner.*

J. H. SCOTT, *Assistant Examiner.*